UNITED STATES PATENT OFFICE 2,075,159

METHOD OF TREATING BEET SEED

Howard M. Andreasen, Tremonton, Utah

No Drawing. Application May 13, 1935,
Serial No. 21,293

1 Claim. (Cl. 146—219)

This invention relates to a process of treating beet seeds so as to make possible the aim of all beet growers, that of securing but one plant at a given place.

All beet seeds are by nature, multiple germ, that is, they contain from two to seven germs each. Any and all of these germs, if properly matured, and subjected to favorable growing conditions, will produce a separate and distinct plant. It, therefore, follows that when one plants a single beet seed, in its natural state, under favorable growing conditions, it will produce anywhere from two to seven separate and distinct plants. All of these plants would be growing on less than ¼ square inch of soil, while the required amount of space of soil to produce or mature one single sugar beet is from 200 to 250 square inches of surface, depending on the fertility and nature of the soil.

To overcome the above difficulty, it has heretofore been absolutely necessary to practice the old thinning operation when the beet plants are from three to five weeks old. The thinning operation has many disadvantages, the primary objection being the enormous amount of time and labor, thus expense, required to thin a few acres of beets.

Another, and possibly the most destructive feature of the thinning operation arises from the fact that when all but one of the small plants are torn from the ground, the remaining plant, being spindly from having grown in a cluster, and some times very much disturbed, is, therefore, very materially set back in its growth.

It is, therefore, the primary object of this invention to so process the whole natural beet seed so that each part, after being broken up, may contain but one germ or embryo, thereby making it possible depending somewhat upon the drilling of the seed, to obtain a perfect stand of beets in the field, of which 90 to 95 out of every 100 plants will be standing single.

One of the important advantages of the single germ seed or piece of seed containing a single germ over the whole, natural multiple germ seed is first, the saving of from 50% to 75% of the time and labor or in other words, the expense of thinning.

Second, a saving of from 50% to 75% in the required amount of seed necessary for planting, depending on the method of drilling.

Third, a saving in plant nourishment, that need be readily available for the growing plant.

Fourth, overcoming the very destructive results of thinning, that leaves the single plant badly disturbed and set back in its growth.

Fifth, the securing of a single plant from the start, instead of a cluster of from two to seven germs, thus preventing the plants from robbing each other of the much needed sunlight, air and soil nourishment and growing more spindly day by day, and further permitting the strong and healthy plants alone to withstand attack by ravages of insects and disease.

With the foregoing and other objects in view, this invention consists of a novel sequence of operations, as will be hereinafter more specifically described and illustrated in the accompanying specification, but it is to be understood that changes and variations and modifications may be resorted to without departing from the object or purpose of the invention or the claim hereunto appended.

The invention in its broadest aspect comprises the treatment of beet seed in any manner to separate the single, natural, multiple germ seed into independent parts, so that each part may contain but a single germ. The term "germ" as used herein means the embryo of a single plant.

This separation is accomplished, after some preparation, by a method of crushing, cutting, or grinding under pressure so that the seed is broken into parts containing but a single germ.

One of the specific methods of carrying out this invention is to take the ordinary, commercial, bulk beet seed, and run it through a grading process, whereby the seed of promiscuous sizes, is reduced to 3 or 4 grades of more or less uniform size. This having been done, it follows that the grades are treated separately. The seed is moistened just before it is run through the machine for best results, at about the rate of one (1) gallon of water to every one hundred (100) pounds of seed, by a fine spray, in such a way that it is evenly applied. Next comes the process of separating the whole seed into parts containing but one germ each.

For this purpose, secure an ordinary burr grinder, preferably of large size, to insure capacity at very low speed. It is very important that the bearings be in good shape and that the shaft be true and all in first class working order.

The burrs must be taken out of the machine and ground on an emery so as to remove the sharp edges, as the burrs must be well worn or dulled, otherwise they are too severe and will destroy too many of the germs.

Beginning with the largest grade of seed: set the machine so that there will be about $\frac{1}{16}$ of an inch between the burrs or plates. Then open the hopper and run some seed through, running the machine at about 250 to 300 revolutions per minute. Examine the mass of seed coming through the machine and adjust the speed and space as the results may indicate. With a little experience one can soon determine whether or not the seed is passing through without being segregrated into its germ-cell compartments, or if those germ-cells are being unduly cut or injured. Any needed readjustment may be readily effected. It follows that the smaller the grade of seed being processed, the closer the burrs must be set.

During the process, there will be a certain amount of loose hull left in the seed after being processed. This can be largely removed by passing the same over a fine screen. There will also be some particles, that are quite large, but containing no germ at all. These need not be taken out, for to obtain best results in planting the processed seed, in the ordinary beet drill, it is necessary to mix about two parts fine grainy saw dust or cinders to one part of the processed seed, in order that it may be planted more evenly, and obtain best results from the single germ seed.

When all of the seed of that particular grade has been ground, another grade is run through the grinder, and the operation is repeated until all the grades have been subjected to the grinding operation. The broken parts of the seeds are collected from the grinder and are ready to be loaded into the hopper of the ordinary beet drill for planting, without further treatment.

The grinding operation performed on the uniform sized seeds breaks the seeds into several parts and results in a yield of approximately ninety two to ninety eight percent of the parts of the seed, containing but a single germ. Furthermore, after considerable experimentation, it has been found that the grinding operation on a burr grinder, does not appreciably injure the germ in the parts of the seed for there has been a constant yield of ninety five percent germination in the parts of the seed planted from an ordinary beet planting drill.

It is to be understood, that by describing in detail herein any particular step or sequence of operation, it is not intended to limit the invention beyond the terms of the claim, or the requirements of the prior art.

It will, of course, be necessary, in order to obtain the full desired results, to perfect a machine that will drill the single germ seed, one at a time.

Having thus described the invention, what is claimed is:

A method of treating beet seed comprising separating the beet seed into uniform sizes, thereafter moistening the graded seed and while in a slightly moist condition, subjecting the graded seed to a crushing operation in a burr mill to break up the individual seeds into several individual parts, so that any one of such individual parts will contain a single germ.

HOWARD M. ANDREASEN.